(12) United States Patent
Kau et al.

(10) Patent No.: US 9,591,304 B2
(45) Date of Patent: Mar. 7, 2017

(54) EVALUATION OF PERCEPTUAL VISUAL QUALITY

(75) Inventors: Jonathan S. Kau, San Jose, CA (US); William G. Mears, Sparks, NV (US)

(73) Assignee: TEKTRONIX, INC., Beaverton, OR (US)

( * ) Notice: Subject to any disclaimer, the term of this patent is extended or adjusted under 35 U.S.C. 154(b) by 427 days.

(21) Appl. No.: 13/477,727

(22) Filed: May 22, 2012

(65) Prior Publication Data

US 2013/0128993 A1 May 23, 2013

Related U.S. Application Data

(60) Provisional application No. 61/556,964, filed on Nov. 8, 2011.

(51) Int. Cl.
*H04N 19/00* (2014.01)
*H04N 19/48* (2014.01)
*G06T 7/00* (2006.01)

(52) U.S. Cl.
CPC ..... *H04N 19/00563* (2013.01); *G06T 7/0002* (2013.01); *H04N 19/48* (2014.11); *G06T 2207/10016* (2013.01); *G06T 2207/20021* (2013.01); *G06T 2207/30168* (2013.01)

(58) Field of Classification Search
CPC .. H04N 19/484; H04N 19/757; H04N 19/763; H04N 19/08; H04N 19/812; H04N 19/933; H04N 19/939; H04N 19/951; H04N 5/783; H04N 5/926; H04N 5/945; H04N 7/26771; H04N 7/26888; H04N 9/8047; H04N 19/86; H04N 19/136; H04N 19/154; H04N 19/48; H04N 5/357; G11B 20/07; G11B 20/10; G11B 20/1833; G11B 2220/20; G11B 2220/90; G11B 27/05; G11B 27/32; G11B 27/34; G06T 7/00; G06T 2207/30168; G06T 7/0002; G09G 2320/0257; G09G 2320/103

USPC ........ 375/240, 316; 382/250, 252, 232, 233, 382/236, 238, 248, 251, 254, 268, 275

See application file for complete search history.

(56) References Cited

U.S. PATENT DOCUMENTS

| | | | | |
|---|---|---|---|---|
| 4,019,066 | A * | 4/1977 | Lucas | G01B 11/30 162/DIG. 10 |
| 2002/0141338 | A1* | 10/2002 | Burke | 370/229 |
| 2003/0112333 | A1* | 6/2003 | Chen et al. | 348/192 |
| 2004/0101055 | A1* | 5/2004 | Hourunranta | 375/240.24 |
| 2004/0114685 | A1* | 6/2004 | Kouloheris et al. | 375/240.03 |
| 2008/0317358 | A1* | 12/2008 | Bressan et al. | 382/224 |

OTHER PUBLICATIONS

K. T. Tan and M. Ghanbari, \Blockiness measurement for MPEG video, Proc. of ISAS 2001, vol. XIII, 2001.*

* cited by examiner

*Primary Examiner* — Richard Torrente
*Assistant Examiner* — Shadan E Haghani
(74) *Attorney, Agent, or Firm* — Francis I. Gray; Marger Johnson

(57) ABSTRACT

A method of evaluating perceptual visual quality (PVQ) of compressed video bit streams in the H.262 or H.264 formats without performing block transforms or prediction decodes I-frames within a group of pictures (GOP). DC and AC coefficients are determined for selected macroblocks within a selected one of the I-frames. Based upon the DC and AC coefficients, the PVQ is calculated.

7 Claims, 4 Drawing Sheets

EVALUATION OF PERCEPTUAL VISUAL QUALITY

BACKGROUND OF THE INVENTION

The present invention relates to compressed image processing, and more particularly to the evaluation of perceptual visual quality on H.262 or H.264 I-frames without performing block transforms or prediction.

Existing methods of evaluating perceptual visual quality (PVQ) of a compressed image have focused on spatial filtering performed on complete decodes of video image streams. Block boundaries associated with "macroblocking" may be detected by registering the image to the block boundary and performing well known edge detection algorithms in both horizontal and vertical axes. Additional attributes, such as "blurriness", may be evaluated on the decoded image by performing other two-dimensional (2D) filtering operations. Although these methods produce excellent figures of merit correlating to subjective video quality, they are computationally intensive, making them impractical for video monitoring.

What is desired is a simpler method of evaluating PVQ that is less computationally intensive.

BRIEF SUMMARY OF THE INVENTION

Accordingly the present invention provides a method of evaluating perceptual visual quality (PVQ) of compressed video bit streams in the H.262 or H.264 formats without performing block transforms or prediction. I-frames within a group of pictures (GOP) are decoded, and DC and AC coefficients are determined for selected macroblocks within a selected one of the I-frames. Based upon the DC and AC coefficients, the PVQ is calculated.

The objects, advantages and other novel features of the present invention are apparent from the following detailed description when read in conjunction with the attached drawing figures and appended claims.

DETAILED DESCRIPTION OF THE INVENTION

The evaluation of PVQ of a compressed video image may be accomplished according to the method described below with very little computation relative to a complete decode of the elementary video stream. The key approximations that allow this methodology are the following:
1) The decoding and evaluation of PVQ performed on I-frames only is highly predictive of the overall video quality. Encoded content tends to have comparable levels of quantization noise in frames of all types (I, P and B) over a time span of several groups of pictures (GOPs). Therefore a proxy for the quantization noise of the I-frames is a reasonably good proxy of the quantization noise of the GOP associated with it.
2) Simple frequency domain analysis of quantized blocks is highly predictive of visually noticeable "macroblocking" and generally poor video image quality. The compression artifact of "macroblocking" may more accurately be described as a large direct current (DC) difference between neighboring blocks unaccompanied by sufficient alternating current (AC) signal magnitude in these blocks to lessen the visual impact of the DC difference. The worst case of this is a DC difference between blocks of 100 IRE (Institute of Radio Engineers units defining the difference in amplitude between a "black" pixel and a "white" pixel in the video image) with no AC coefficients in either block. A large DC difference with many AC coefficients of reasonable magnitude tends to be perceived as a high quality image, since the edges of the neighboring macroblocks tend to closely match one another. A small DC difference between blocks is not noticeable, even in the complete absence of AC coefficients in either block. Between these extreme test cases, there is a continuum of cases that may be quantified.

Figure 1:
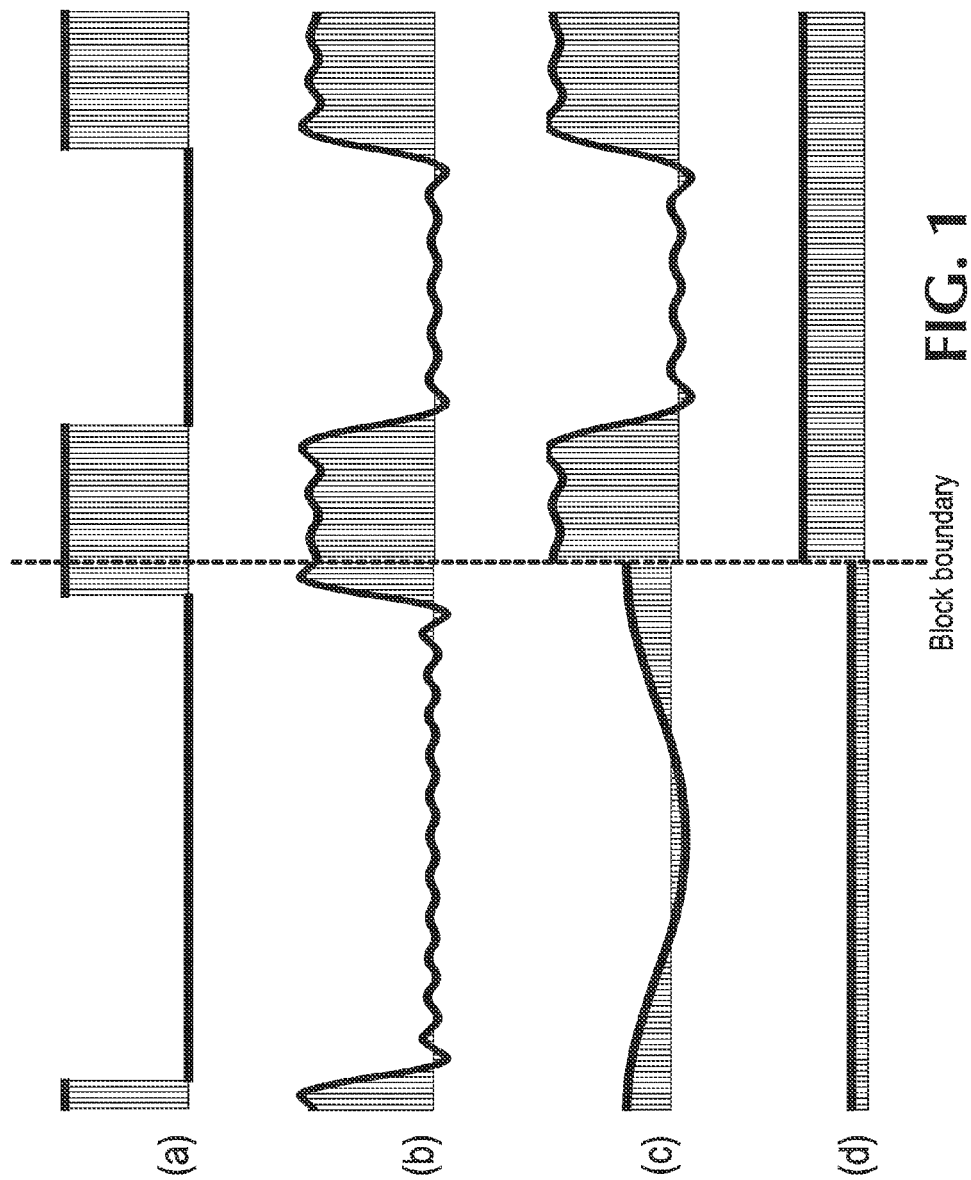
FIG. 1 is a graphic view illustrating adjacent pairs of one-dimensional discrete spatial functions which are subjected to increasing levels of quantization of discrete cosine transform coefficients.

Referring now to FIG. 1, the adjacent pairs of one-dimensional (1D) discrete spatial functions, which are subjected to increasing levels of quantization of their discrete cosine transform (DCT) coefficients illustrates the frequency domain analysis. FIG. 1(a) has not frequency components removed, while FIG. 1(d) has all frequency components except DC removed. Both the loss of detail within a block and the large quantization loss contribute to visually detectable objectionable artifacts. The matching levels at the block boundary and the sharp transitions within each block are degraded progressively with the loss of high frequency components. As this occurs over a large number of blocks, the aggregate effect is a disproportionate number of sharp transitions at block boundaries with a corresponding loss of sharp transitions away from the block boundaries, which is seen as block sized tiles in the video image.

Figure 2:
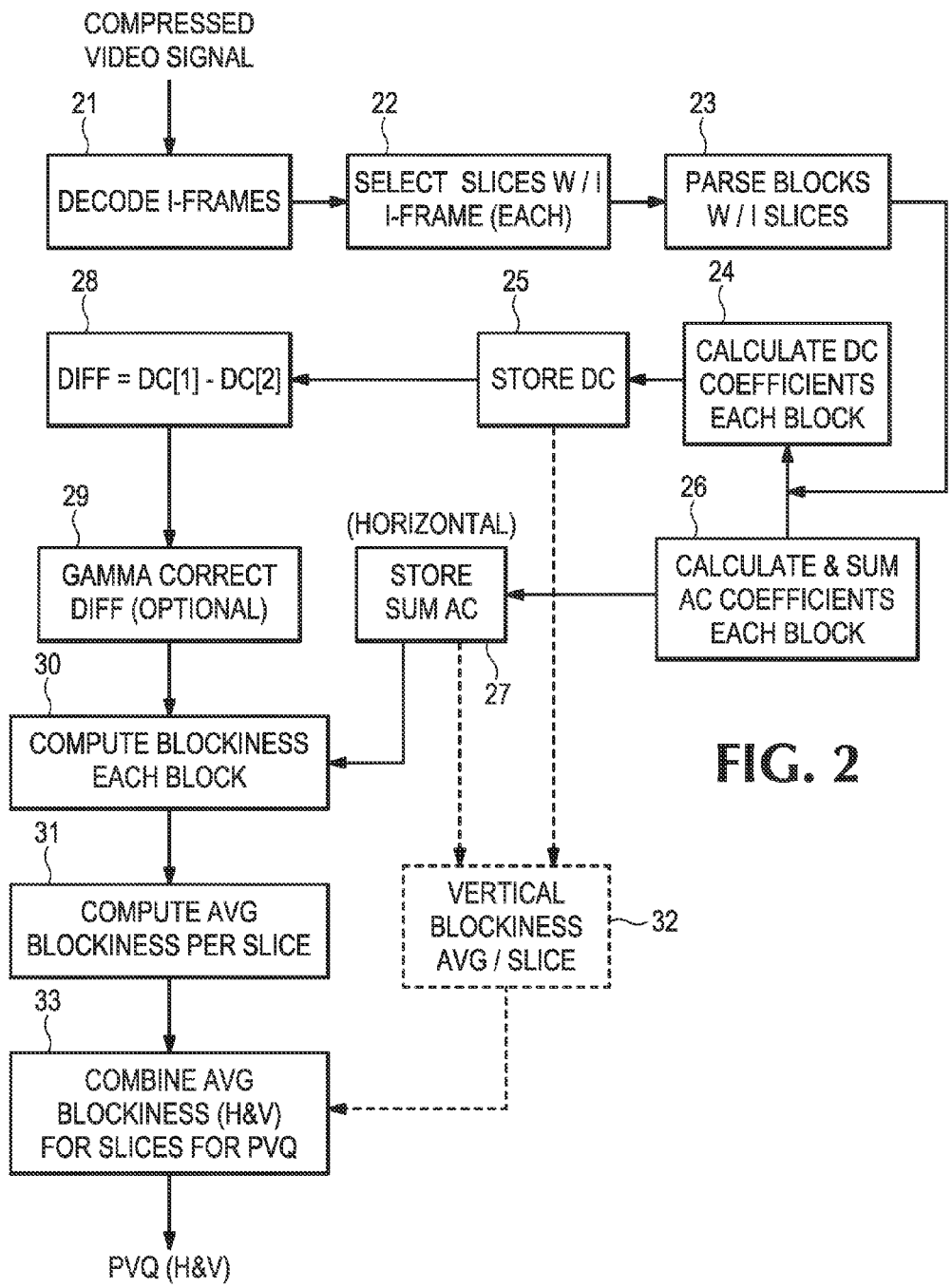
FIG. 2 is a generic flow chart view for evaluating perceptual visual quality of a compressed video bit stream according to the present invention.

Referring now to the evaluation of PVQ for H.262 video, as shown in FIG. 2, a slice within an I-frame which has been decoded from an input compressed video signal (step 21) may be individually selected (step 22) for PVQ analysis. Since image complexity is often greater in the middle of an image, the middle N consecutive slices in an image, both horizontal and vertical, are most representative of the blockiness of the entire image, and therefore are selected for analysis.

The slices are delimited by MPEG-2 (Motion Picture Experts Group standard for compressing/decompressing interlaced video images) start codes in the compressed video bitstream. Parsing of the blocks (step 23) is bitstream sequential, since the only bitstream delimiters are the MPEG start codes. However, parsing may be terminated after the complete parsing of any desired number of macroblocks less than the number of macroblocks in a slice. DC coefficients are calculated (step 24) and stored (step 25) immediately after their syntactic construct is parsed. AC coefficients are parsed, decoded, summed (step 26) and stored (step 27) several at a time in a single table lookup. Only the sum of the AC coefficients per block is stored for later analysis.

The following steps are performed on luminance (luma) blocks (msiVideoMp2QSlice.c):
1) The absolute DC difference between adjacent blocks is calculated (step 28);

2) The absolute DC difference is optionally gamma corrected to compensate for the fact that small differences of brightness may appear very blocky at average brightness (step 29):

correctedDifference*CDC*Diff[*1*]=abs(*DC*[*1*]−*DC*[*2*]
*gamma(gammaFactor,(*DC*[*1*]+*DC*[*2*])/2)

3) In step 30 the absolute DC difference is divided by the sum of AC coefficients times qScale, then clipped to a maximum value for each of the two blocks—clipping is necessary to limit the contribution to the overall average of any given edge. A small number of really blocky edges are not as perceptible as a large number of moderately blocky edges, so proper clipping accentuates this fact. The resulting quotients are averaged:

Blockiness[1]=(clip(*CDC*Diff[1,2]/(sum*AC*[*1*]**q*Scale[1])+clip(*CDC*Diff[1,2]/(sum*AC*[*2*]**q*Scale[2]))/2

4) These average quotients are summed and divided by the number of macroblocks analyzed to produce an average blockiness per macroblock of the slice (step 31);
5) A similar process is also done to generate a sum for comparison of vertically adjacent blocks, shown representationally as step 32, with vertically adjacent blocks from adjacent slices being averaged also in an identical way;
6) These averages represent the horizontal and vertical blockiness of the slice.

Chrominance (chroma) blocks may be analyzed similarly to produce an average chroma blockiness per slice.

The average horizontal and vertical blockiness per slice is calculated. The resultant composites are combined (step 33) for a set of adjacent slices to form a PVQ metric. The total number of edges of vertically adjacent blocks is less than the total number of edges of horizontally adjacent edges for a given set of adjacent macroblocks. Also the term "horizontal edge" denotes an edge between horizontally adjacent blocks, and the term "vertical edge" denotes an edge between vertically adjacent blocks. For every 2*N horizontal edges, there are 2*N−1 vertical edges. This difference may be compensated as N becomes small (<=3), but is not otherwise.

Figure 3:
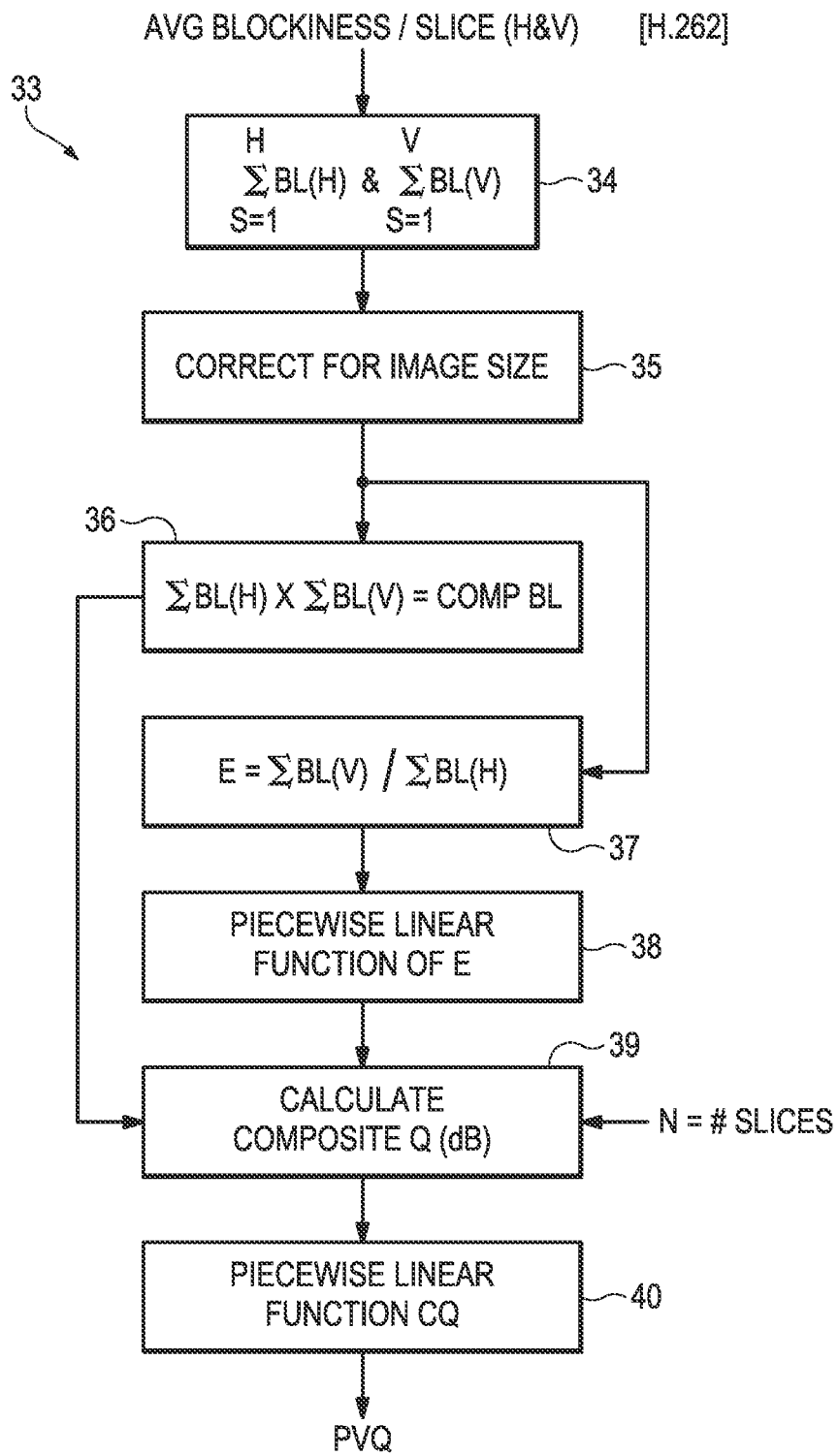
FIG. 3 is a flow chart view providing details of the generic flow chart view of FIG. 2 for an H.262 compressed video bit stream according to the present invention.

The PVQ metric of step 33 is calculated as follows, as shown in FIG. 3:
1) The horizontal and vertical blockiness averages are summed over all the analyzed slices (step 34);
2) The resultant sums are corrected (step 35) via a piecewise linear function for image size—larger images are less degraded for a given amount of average blockiness, so the sums are multiplied by a number less than one for high definition (HD) images;
3) The corrected blockiness values are multiplied together to produce a composite blockiness (step 36);
4) The eccentricity of blockiness—the ratio of the more blocky axis to the less blocky axis—is calculated (step 37);
5) A piecewise linear function is performed on the eccentricity to produce an eccentricity correction factor (step 38);
6) Composite quality is calculated (step 39) as follows:

compositeQuality=10*log(slicesToAnalyze^2*eccentricityCorrection/compositeBlockiness)

7) PVQ(frame) is produced by performing a piecewise linear transfer function of compositeQuality (step 40):

*PVQ*(frame)=*PVQ*TransferFunction(compositeQuality)

Some time averaging of the individual PVQ(frame)s is needed, since individual I-frames are occasionally of low quality but are now perceived as being degraded. Multiple consecutive degraded I-frames and the correspondingly degraded P and B frames usually produce a long enough period of degradation to be perceptible. The following temporal averaging is performed:
1) PVQ(frame) is filtered with a first or infinite impulse response (IIR) filter, and the output of the filter is input to a quality averager, which is initialized identically to a QOE averager;
2) The output of the IIR filter is sampled every GOP and one instance of it is input to the quality averager for every field period that has elapsed since the last GOP boundary to properly compensate the PVQ value for varying frame and GOP durations.

The adjustable and optional parameters involved in the PVQ calculation include:
- number of slices to analyze, i.e., default is 5;
- percentage of macroblocks to analyze, i.e., default is 100%;
- clipping ceiling as a fraction of maxDCvalue, i.e., default is 10%;
- include chroma blockiness, i.e., default is "off";
- gamma correction factor, i.e., default is 1.0 or no gamma correction;
- piecewise linear eccentricity function, i.e., default is flat transfer or no eccentricity correction;
- piecewise linear blockiness to PVQ transfer function;
- temporal pre-filter time constant, i.e., default is 0.25°
- average setup, i.e., default is the same as for video QOE.

For H.264 processing, the intra-microblocks are decoded entirely differentially—intra-block prediction is used for every block. This means that reconstructing an I-frame image requires a complete decode of the I-frame. In the H.262 method described above, horizontal and vertical differences and DC/AC ratios are aggregated to produce a proxy for PVQ. The same technique applied to H.264 would require a complete decode and, therefore, require a large amount of additional computing compared to the H.262 method. Also H.264 uses neighboring block intra-prediction which is based on horizontal, vertical, average of horizontal+vertical, and various diagonal modes. Regardless of the prediction mode employed, the DC component of a block represents the average level difference between a block and the selected edge pixels of the selected neighboring block(s), and the total AC component magnitude represents the degree to which the block-to-block mismatch is visually imperceptible.

Whereas a large DC mismatch between adjacent blocks without sufficient AC content to match it results in "blockiness" in H.262, the visual result of a large mismatch in H.264 depends upon the prediction mode. In DC prediction mode, the result is "blockiness." For vertical or horizontal prediction modes, the result is vertical or horizontal stripes. For the remaining prediction modes, the result is diagonal stripes with an orientation prescribed by the prediction mode. Any of these artifacts makes the block in question visually perceptible to some degree dependent on the prediction mode and block transform size.

Figure 4:
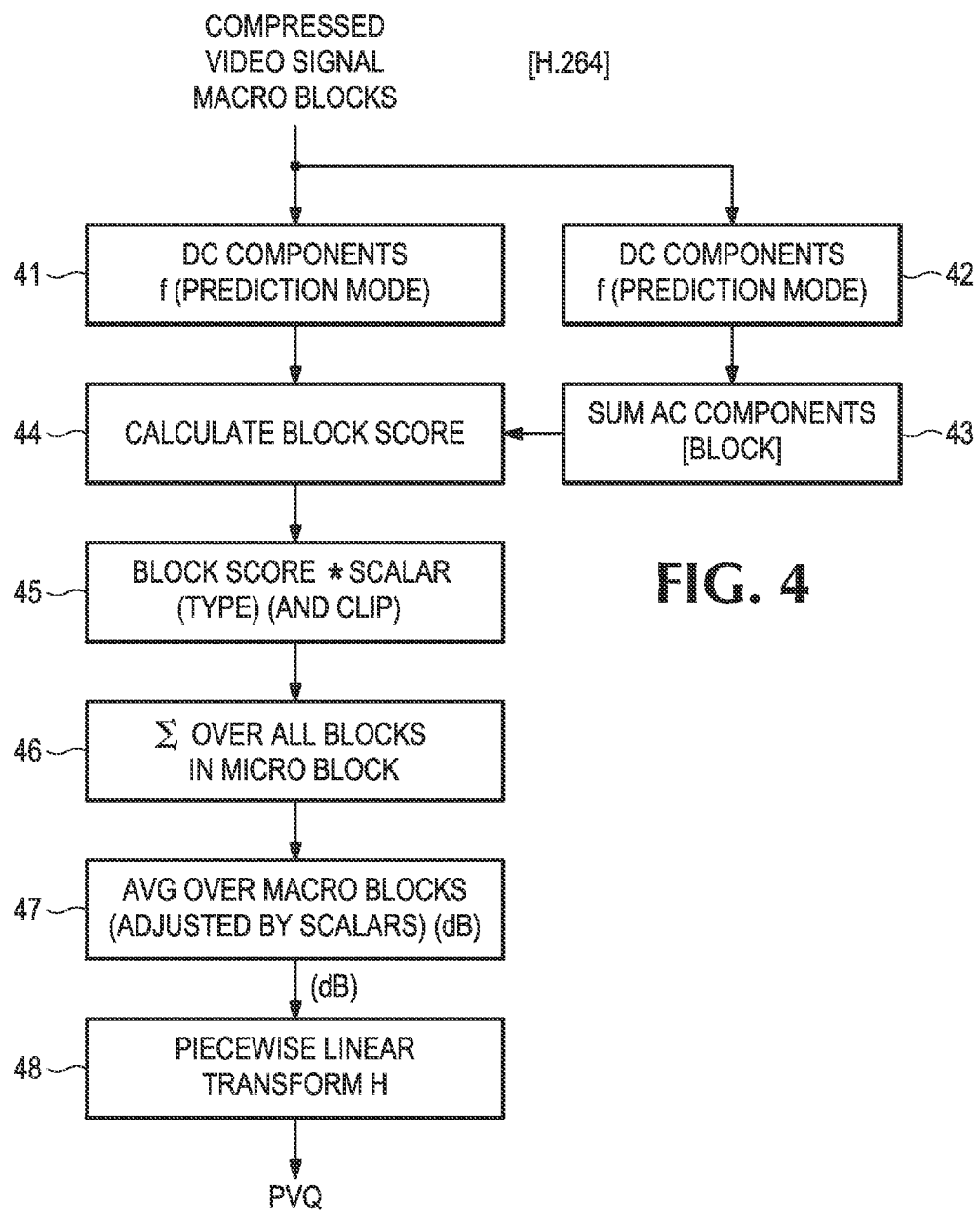
FIG. 4 is a flow chart view providing details of the generic flow chart view of FIG. 2 for an H.264 compressed video bit stream according to the present invention.

The following procedure of FIG. 4 describes a general method of computing PVQ for an I-frame or fraction thereof:
1) Decode, transform and scale luma DC components of the macroblocks (step 41);
2) Decode and scale luma AC components of the macroblocks (step 42);
3) For each block in the macroblock, call the resultant matrices luma4×4[block] or luma8×8[block], depending on the transform type—luma4×4[block][0][0] is denoted as "DC[block]", and the sum of all luma4×4 [block][i][j], where 0<=i<4 OR 0<=j<4 is denoted "ACSum[block]" for 4×4 transforms; and luma8×8 [block][0][0] is denoted as DC[block], and the sum of all luma8×8[block][i][j], where 0<=i<8 OR 0<=j<8 is denoted "ACSum[block]" for 8×8 transforms (step 43);

4) In step 44 calculate the blockScore[block] as:

blockScore[block]=lumaDC[block]/min(1.0,ACSum[block])

5) In step 45 multiply blockScore[block] by a scalar based on the intra-block prediction mode:

modeAdjustedBlockScore[block]=blockScore[block] *predModeScalar[predictionMode]

6) Clip to some level to limit excessive contribution of individual blocks:

clippedBLockScore=Clip(a,b,modeAdjustedBlockScore[block])

7) In step 46 sum clippedBlockScore[block] for all blocks within each macroblock:

macroblockScore=$\Sigma_{all\ blocks}$clippedBLockScore[block]

8) Multiply each macroblockScore by a scalar depending on the transform type:

AdjustedMacroblockScore=macroblockScore*(transform8×8typeScalarFor8×8:ScalarFor4×4)

9) In step 47 sum adjustedMacroblockScore over the desired number of macroblocks and divide by the number of macroblocks evaluated to get aggregateScore;

10) Convert aggregateScore to db:

aggregateScoreDb=20*log 10(aggregateScore)

11) In step 48 calculate framePVQ=H(aggregateScoreDb), where H is an empirically derived piecewise linear transfer function.

Thus the present invention provides a method of evaluating perceptual visual quality (PVQ) on H.262 and H.264 compressed video bitstreams without performing block transforms or predictions by decoding only I-frames and evaluating DC and AC coefficients for macroblocks within the decoded I-frames to calculate the PVQ.

What is claimed is:

1. A method of evaluating perceptual video quality (PVQ) for a compressed video bit stream comprising the steps of:
    decoding an I-frame within a group of pictures (GOP) within the compressed video bit stream to produce a decoded I-frame;
    selecting macroblocks within the decoded I-frame to produce selected macroblocks for analysis, each macroblock having a plurality of blocks;
    determining DC and AC coefficients for the selected macroblocks;
    calculating the PVQ for the compressed video bit stream as a function of the DC and AC coefficients by:
    obtaining a DC difference value between DC coefficients of adjacent blocks in each selected macroblock;
    summing the AC coefficients for each block within each selected macroblock to produce AC sum values;
    computing a blockiness value for each block as a function of the DC difference values and the AC sum values by multiplying the sum of AC coefficients by qscale and dividing the DC difference value by the sum of AC coefficients times qscale;
    computing an average blockiness value per each selected macroblock;
    combining the average blockiness values for the selected macroblocks to produce the PVQ indicating a quality of the decoded I-frame based on blockiness values of the selected macroblocks; and
    employing the PVQ of the decoded I-frame to predict an overall video quality of the GOP within the video bit stream.

2. The method as recited in claim 1 wherein the selecting step comprises selecting slices within the decoded I-frame as the macroblocks where the compressed video bit stream is an H.262 compressed video bit stream.

3. The method as recited in claim 2 wherein the combining step comprises the steps of:
    summing the average blockiness values derived for horizontally adjacent blocks to produce a summed horizontal blockiness value;
    summing the average blockiness values derived for vertically adjacent blocks to produce a summed vertical blockiness value;
    computing a composite blockiness value as a function of the summed horizontal and vertical blockiness values;
    computing an eccentricity value from the summed horizontal and vertical blockiness values;
    calculating a composite quality value as a function of the eccentricity value, of the composite blockiness value and of the number of slices within the I-frame being analyzed;
    deriving the PVQ from the composite quality value.

4. The method as recited in claim 3 further comprising the step of correcting the summed horizontal and vertical blockiness values as a function of image size prior to the composite blockiness and eccentricity computing steps.

5. The method as recited in claim 2 further comprising the step of gamma correcting the DC difference value prior to input to the blockiness value computing step.

6. The method as recited in claim 1 further comprising the steps of:
    repeating the decoding, selecting, determining and calculating steps for a plurality of GOPs to produce a plurality of PVGs; and
    averaging the PVGs to determine an overall PVG for the compressed video bit stream.

7. The method of claim 1, wherein computing the blockiness value further comprises clipping the DC difference and AC sum values to limit particular edges contribution to the PVQ.

* * * * *